Dec. 3, 1968     M. STOLTZE     3,414,347

BINOCULAR WITH PIVOTED LENS PLATE

Filed March 30, 1965     2 Sheets-Sheet 1

INVENTOR.
MORTON STOLTZE
BY
JOHN P. CHANDLER
HIS ATTORNEY.

Dec. 3, 1968  M. STOLTZE  3,414,347
BINOCULAR WITH PIVOTED LENS PLATE
Filed March 30, 1965  2 Sheets-Sheet 2
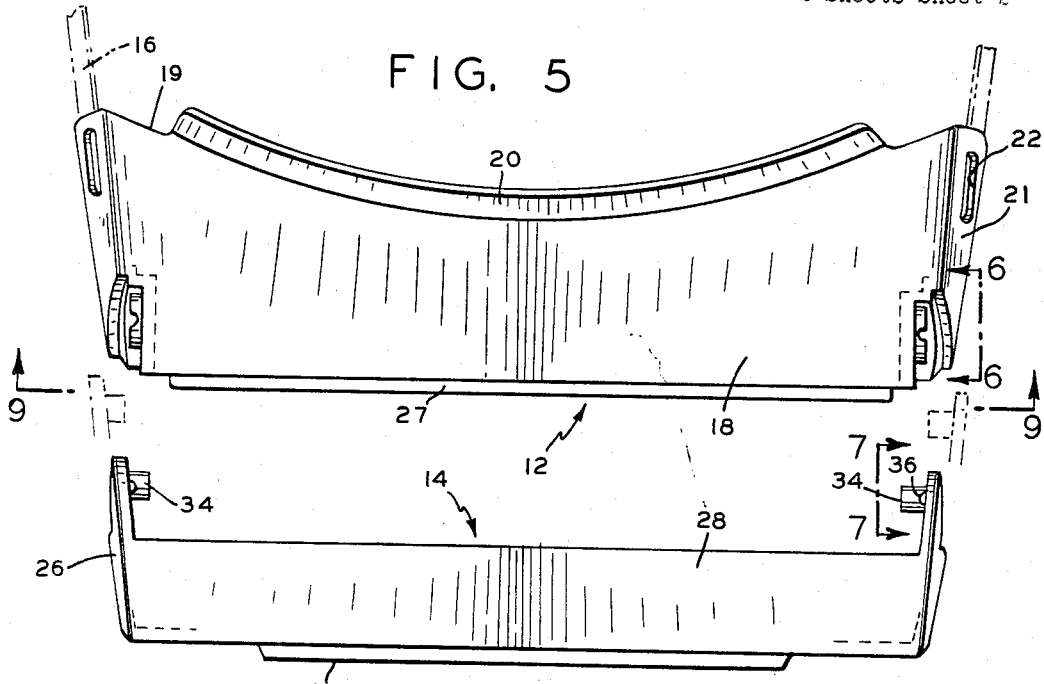
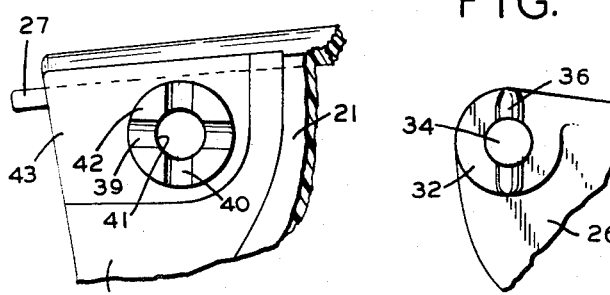
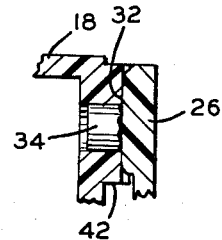
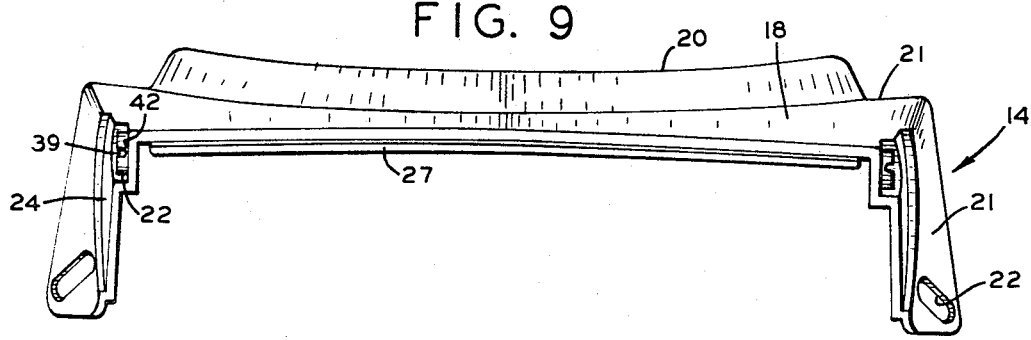
INVENTOR.
MORTON STOLTZE
BY
JOHN P. CHANDLER
HIS ATTORNEY.

3,414,347
BINOCULAR WITH PIVOTED LENS PLATE
Morton Stoltze, Bronx, N.Y., assignor to Edroy Products Company, Inc., New York, N.Y., a corporation of New York
Filed Mar. 30, 1965, Ser. No. 443,949
1 Claim. (Cl. 350—145)

This invention relates to binocular magnifying devices and more particularly to a binocular magnifying device for head wear.

Magnifying devices of this type have previously been designed for a particular magnifying power and consequently are limited to work positioned at a certain distance from the eyes. In order to change this condition, it is necessary to have two complete devices, or more, depending upon the circumstances.

One of the objects of the present invention is to provide a device which can be used for various powers of magnification.

Another object is the construction of a device for use with work at various distances from the eyes.

A further object is to provide a magnifying binocular having interchangeable lenses mounted in lens plates which are readily removed from a main frame, the lens plate also being pivoted so as to be raised to position it out of line of sight.

One feature of the invention includes a magnifying binocular comprising a main frame shaped along one side to fit the forehead. A head band is attached to the main frame to support the device upon the head. A lens plate with lenses mounted therein is pivotally attached to the main frame for rotatable movement from its functional position within the line of sight into position outside the line of sight, thus providing a quick change from magnified vision to normal vision. The pivoting lens plate is so designed and arranged as to permit quick removal from the main frame by flexing it sufficiently to withdraw the pivoting members of the plate from the coacting members of the main frame.

For a better understanding of the present invention together with other and further objects, reference is had to the following description taken in conjunction with the accompanying drawings, wherein:

FIG. 5 is an exploded plan view;

FIG. 6 is a view along line 6—6 of FIG. 5;

FIG. 7 is a view along line 7—7 of FIG. 5;

FIG. 8 is a sectional view taken along line 8—8 of FIG. 2; and

FIG. 9 is a bottom plan view of the main frame.

Figure 1:
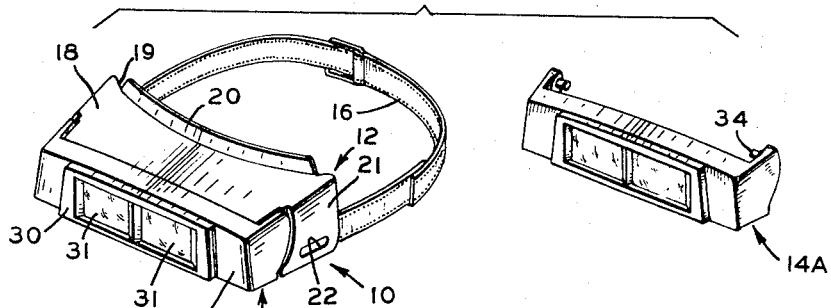
FIG. 1 is a perspective view of the binocular including a spare lens and lens plate.
Figure 4:
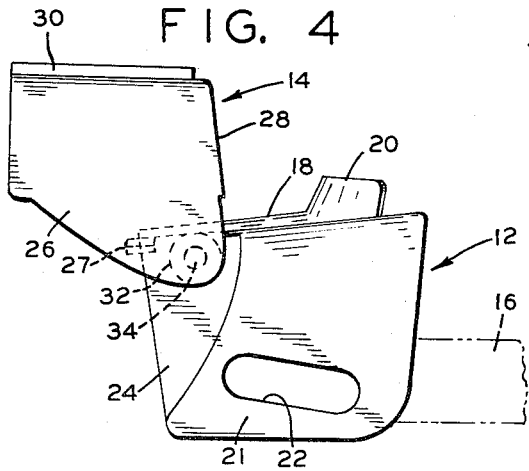
FIG. 4 is a side elevational view showing the lens plate in raised position and out from the line of vision.

The magnifying binocular generally indicated 10 is constructed with two parts, a main frame 12 and a lens plate 14 which is pivotally mounted upon the main frame for rotatable movement out of the line of vision as clearly shown in FIG. 4. With reference to FIG. 1, it will be noted that the binocular magnifier 10 is equipped with a head band 16 which is adjustable to fit heads of varying sizes. Furthermore, the binocular is provided with at least one additional lens plate 14A which is interchangeable with lens plate 14 as will be described below. With particular reference to FIGS. 1 through 4, it will be seen that the main frame is a hooded structure having a top plate 18 whose rear edge 19 is concavely curved to fit the contour of the front of the head of the wearer. This edge also has an upwardly extending flange 20. At each end of the top plate, there is a downwardly extending side section 21 disposed on a plane greater than a right angle to the plane of the top plate.

Each side section has an elongated opening 22 to secure the terminal of the head band, and the upper front corner section is recessed at 24 to receive the side section 26 of the lens plate in nested relation, said lens plate also has a top plate 28 and a front section 29 supporting a frame 30 for mounting a pair of lenses 31 therein. The main frame also has a forwardly projecting flange 27 which underlies the rear edge of the lens plate to prevent light from passing downwardly. Both the main frame and the lens plate may be cast or molded in a single piece from plastic material. One pair of end sections have pivot openings and the other pair have pivot elements received therein. In the arrangement shown, the pivot elements are carried by the lens plate.

The upper rear corner of each side section of the lens plate has an inwardly facing boss 32 with a pivot pin 34 in the center thereof and projecting from each side of the pivot pin on the face of the boss is a rib 36 which is received in spring urged relation in one of the two recesses or detents 39 and 40 extending radially from an opening 41 in a circular projection 42 on a flat section 43 which is received still further inwardly in side section 21 of the main frame.

Figure 2:
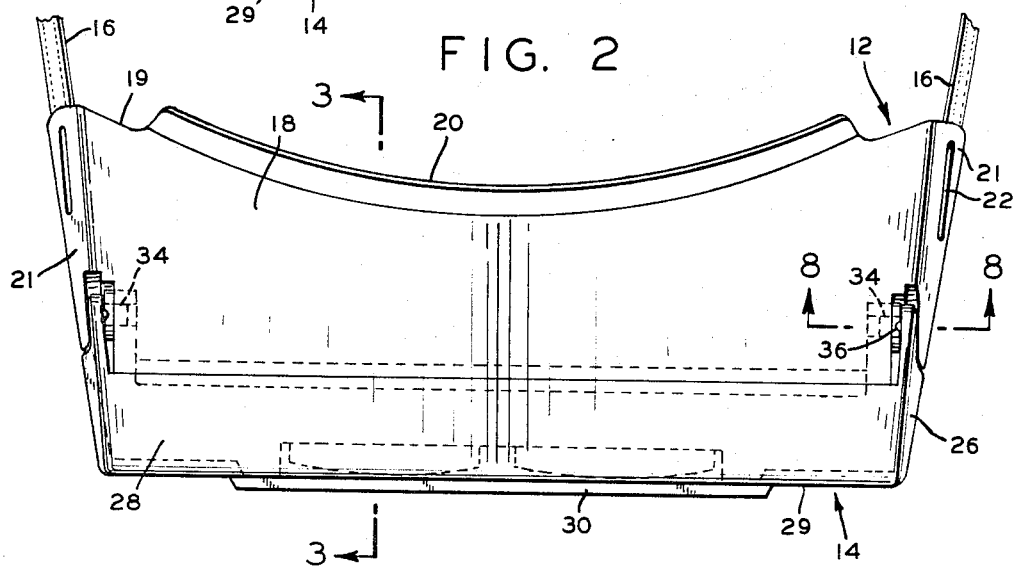
FIG. 2 is a plan view of the device.
Figure 3:
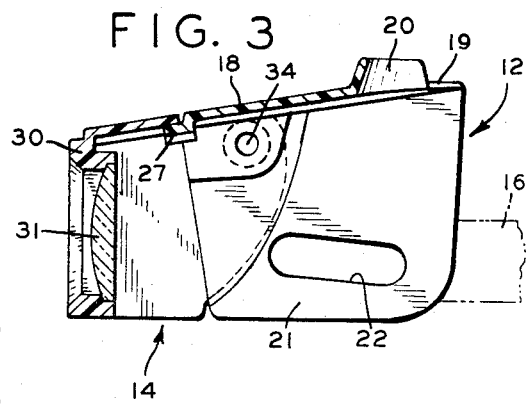
FIG. 3 is a sectional view taken along line 3—3 of FIG. 2.

It will be seen from an examination of FIGS. 2 and 5 that the opposed side sections 21 of the main frame are not parallel but rather are converging towards front and the same is true of the opposed side sections 26 of the lens plate thus giving the entire structure a streamlined appearance. The side sections 26 of the lens plate and the pivot members 34 and bosses 32, are so proportioned that when the lens plate is pivotally mounted in the main frame the ribs 36 are urged into the detents 39–40. Accordingly, when the lens plate is in the raised position of FIG. 4, it remains in this raised position until it is pulled downwardly with sufficient force to unseat the rib 36 from vertical detent 40.

To detach the lens plate from the frame, it is only necessary to shorten the distance between projections 42 on the main frame so as to permit removal of the pivot pins therefrom. This can be done by flexing the top plate 18 of the main frame downwardly. The same result can be achieved by flexing the rear terminals of the side sections 26 of the lens plate as indicated by the broken lines in FIG. 5.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

I claim:

1. A magnifying binocular provided with an adjustable head-band for mounting on the user's head and including a main frame with a curved rear edge having an upwardly extending flange to engage the user's forehead and a lens plate provided with a front wall and magnifying lenses mounted therein and pivotable on the main frame for rotatable movement from its functional lower position within the line of sight into a raised position outside the line of sight, providing a change from magnified position to normal position in the line of sight, the main frame and the lens plate provided with flat top plates and pairs of opposed, downwardly extending end sections to form a hood-like structure, the pair of end sections of one of the members having recesses to receive the end plates of the other member in nested relation, one pair of said end sections having pivot openings and the other pair having pivot pins received in the pivot openings to permit the lens plate to be raised above the line of sight, and detent means for retaining the lens plate in raised and in lowered positions comprising a radial rib in one of the members extending through the axis of the pivot pins, and a pair of radial detents receiving the rib carried by the other member, the lens plate being detachable from the main frame by flexing one of the members with respect to the other to detach said pivot from said opening.

References Cited

UNITED STATES PATENTS

| 1,178,072 | 4/1916 | Hoag | 350—277 |
| 2,935,910 | 5/1960 | Schmidt | 351—156 X |
| 2,986,970 | 6/1961 | Kilgour et al. | 351—59 |
| 3,014,405 | 12/1961 | Swikart | 350—335 X |
| 3,238,005 | 3/1966 | Petitto | 351—59 |
| 2,679,191 | 5/1954 | Tomlin | 351—59 |

DAVID SCHONBERG, *Primary Examiner.*

T. H. KUSMER, *Assistant Examiner.*